(12) United States Patent
Yamaguchi et al.

(10) Patent No.: US 9,056,418 B2
(45) Date of Patent: Jun. 16, 2015

(54) INJECTION APPARATUS

(71) Applicant: KABUSHIKI KAISHA TOYOTA JIDOSHOKKI, Kariya-shi, Aichi-ken (JP)

(72) Inventors: Kazuyuki Yamaguchi, Kariya (JP); Masaya Nakamura, Kariya (JP); Kenji Omiya, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/351,618

(22) PCT Filed: Oct. 2, 2012

(86) PCT No.: PCT/JP2012/075523
§ 371 (c)(1),
(2) Date: Apr. 14, 2014

(87) PCT Pub. No.: WO2013/058102
PCT Pub. Date: Apr. 25, 2013

(65) Prior Publication Data
US 2014/0314892 A1    Oct. 23, 2014

(30) Foreign Application Priority Data

Oct. 19, 2011   (JP) .................................. 2011-230018

(51) Int. Cl.
*B29C 45/77*  (2006.01)
*B29C 45/80*  (2006.01)
(Continued)

(52) U.S. Cl.
CPC .............. *B29C 45/77* (2013.01); *B22D 17/32* (2013.01); *B29C 45/76* (2013.01); *B29C 45/531* (2013.01);
(Continued)

(58) Field of Classification Search
CPC .................................................... B29C 45/77
USPC ........................................................ 425/149
See application file for complete search history.

(56) References Cited

U.S. PATENT DOCUMENTS

| 5,887,641 A | 3/1999 | Iwamoto et al. | |
| 2003/0062643 A1* | 4/2003 | Bulgrin et al. | 264/40.1 |

(Continued)

FOREIGN PATENT DOCUMENTS

| JP | 2-142664 A | 5/1990 |
| JP | 9-52164 A | 2/1997 |

(Continued)

OTHER PUBLICATIONS

Communication dated Sep. 9, 2014 from the Japanese Patent Office in counterpart application No. 2011-230018.

(Continued)

*Primary Examiner* — Tim Heitbrink
(74) *Attorney, Agent, or Firm* — Sughrue Mion, PLLC

(57) ABSTRACT

An injection apparatus includes a pressure accumulating portion connected to an operation chamber of an injection cylinder. A control unit controls the speed at which the injection cylinder moves and is connected to a rod of the injection cylinder. The control unit includes a rotary shaft that follows the movement of the rod and is capable of moving in the same direction as the rod, a conversion mechanism that converts the linear motion of the rod into the rotation of the rotary shaft, and a rotation member coupled to the rotary shaft. The control unit further includes a resistance generating member that generates a frictional resistance by coming into sliding contact with the rotation member, an actuating member that is moved by an electric drive source, and a movement mechanism that follows the movement of the actuating member and moves the resistance generating member relative to the rotation member.

10 Claims, 6 Drawing Sheets

(51) Int. Cl.
  *B22D 17/32* (2006.01)
  *B29C 45/53* (2006.01)
  *B29C 45/76* (2006.01)

(52) U.S. Cl.
  CPC ............... *B29C 2945/76578* (2013.01); *B29C 2945/76605* (2013.01); *B29C 2945/76658* (2013.01); *B29C 2945/76692* (2013.01)

(56) References Cited

U.S. PATENT DOCUMENTS

| | | | | |
|---|---|---|---|---|
| 2003/0080452 | A1* | 5/2003 | Bulgrin et al. | 264/40.1 |
| 2008/0089964 | A1* | 4/2008 | Kianpour et al. | 425/150 |
| 2009/0242161 | A1 | 10/2009 | Uchida et al. | |
| 2010/0000699 | A1 | 1/2010 | Uchida et al. | |

FOREIGN PATENT DOCUMENTS

| | | |
|---|---|---|
| JP | 2002-28765 A | 1/2002 |
| JP | 2003-112248 A | 4/2003 |
| JP | 2004-74533 A | 3/2004 |
| JP | 3662001 B2 | 6/2005 |
| JP | 2008-30379 A | 2/2008 |
| JP | 2008-105055 A | 5/2008 |
| JP | 2013-18011 A | 1/2013 |
| WO | 2008/035805 A1 | 3/2008 |

OTHER PUBLICATIONS

International Preliminary Report on Patentability dated Apr. 22, 2014 from the International Searching Authority in counterpart application No. PCT/JP2012/075523.

* cited by examiner

INJECTION APPARATUS

CROSS REFERENCE TO RELATED APPLICATIONS

This application is a National Stage of International Application No. PCT/JP2012/075523 filed Oct. 2, 2012, claiming priority based on Japanese Patent Application No. 2011-230018 filed Oct. 19, 2011, the contents of all of which are incorporated herein by reference in their entirety.

FIELD OF THE INVENTION

The present invention relates to an injection apparatus that injects molding material into a mold through an injection cylinder actuated by fluid pressure of incompressible fluid, thus filling the mold with the molding material.

BACKGROUND OF THE INVENTION

Typically, an injection apparatus of a molding machine moves an injection plunger forward in a sleeve using an injection cylinder to press molding material out from the sleeve into a cavity formed between a pair of mold portions. The molding material is thus injected, or supplied, into the cavity. The injection, or supply, step includes a low-speed step, a high-speed step, and a pressure-increasing step. Specifically, the injection apparatus moves the injection plunger forward at a comparatively low speed at the initial stage of injection such that the molding material does not catch air. The injection apparatus then moves the injection plunger forward at a comparatively high speed to shorten the time necessary for a molding cycle. Subsequently, to avoid sink mark formation, the injection apparatus pressurizes the molding material in the cavity with the force acting in the direction in which the injection plunger moves forward. To ensure the series of operation performed by the injection apparatus, an injection apparatus (a die cast machine) disclosed in Patent Document 1, for example, has been proposed.

As illustrated in FIG. 10, the injection apparatus of Patent Document 1 includes a hydraulic circuit. An injection, or supply, step is carried out through hydraulic pressure control in the hydraulic circuit. Specifically, in the injection apparatus, a supply accumulator 82 communicating with a gas cylinder 81 is connected to a head portion 80a of an injection cylinder 80 through a passage. A pilot check valve 84 and a speed control valve 85 are mounted in the passage. Hydraulic fluid is delivered to the supply accumulator 82 after having been pressurized to a predetermined pressure by a hydraulic pressure pump 83a.

A pressure-increasing step accumulator 87 communicating with a gas cylinder 86 is connected to a passage connected to the speed control valve 85. A flow control valve 88 is located in a passage by which the supply accumulator 82 and the pressure-increasing step accumulator 87 are connected to the head portion 80a of the injection cylinder 80. By controlling the flow rate of hydraulic fluid through the flow control valve 88, the movement speed of a piston 80c of the injection cylinder 80 is controlled.

The injection apparatus of Patent Document 1 carries out a low-speed step and a high-speed step by supplying hydraulic fluid from the supply accumulator 82 to the head portion 80a of the injection cylinder 80 to move the piston 80c at a low speed or a high speed. The movement speed of the piston 80c is controlled by controlling the speed control valve 85. A pressure-increasing step is performed by supplying pressurized hydraulic fluid from the pressure-increasing step accumulator 87 to the head portion 80a of the injection cylinder 80. At this stage, the pressurization time is controlled by controlling the flow rate of the hydraulic fluid by means of the flow control valve 88.

PRIOR ART DOCUMENTS

Patent Documents

Patent Document 1: Japanese Patent No. 3662001

SUMMARY OF THE INVENTION

As has been described, the injection apparatus disclosed in Patent Document 1 accomplishes the low-speed step, the high-speed step, and the pressure-increasing step by controlling the speed control valve 85 and the flow control valve 88 to control the hydraulic pressure in the hydraulic circuit. In other words, the technique described in Patent Document 1 satisfies injection speed and injection pressure required for each one of the steps by controlling the opening degree of the hydraulic fluid passage through control on the speed control valve 85 and the flow control valve 88. However, according to the technique of Patent Document 1, before a target injection speed and a target injection pressure are achieved, the opening degree of the hydraulic fluid passage must be adjusted to a target opening degree through movement of valve bodies (not shown) of the speed control valve 85 and the flow control valve 88 such that a target hydraulic pressure acts on, or, in other words, is applied to, the head portion 80a. This degrades the responsiveness of the injection apparatus.

Accordingly, it is an objective of the present invention to provide an injection apparatus capable of improving responsiveness.

To achieve the foregoing objective and in accordance with one aspect of the present invention, an injection apparatus is provided that injects molding material into a mold through an injection cylinder operated by fluid pressure of an incompressible fluid to fill the mold with the molding material. The injection cylinder has a side connected to the mold and an operation chamber located at the opposite side to the side. The injection apparatus includes a pressure accumulating portion connected to the operation chamber to accumulate the fluid pressure, a rod mounted in the injection cylinder and projected from the operation chamber in a direction separating from the mold, and a control unit connected to the rod to control the movement speed of the rod. The control unit includes a rotary shaft movable in the same direction as the movement direction of the rod in a manner following movement of the rod, a conversion mechanism for converting linear movement of the rod to rotation of the rotary shaft, a rotation member connected to the rotary shaft and rotated integrally with the rotary shaft, a resistance generating member sliding on and contacting the rotation member to generate friction resistance, an actuating member moved by an electric drive source, and a movement mechanism for moving the resistance generating member relative to the rotation member in a manner following movement of the actuating member.

In this configuration, the pressure accumulating portion is connected to the operation chamber of the injection cylinder. The hydraulic pressure applied by the pressure accumulating portion maintains the rod of the injection cylinder in a standby state, where the rod is immediately movable toward the mold. Movement of the rod is controlled by the control unit. The control unit controls the movement speed of the actuating member through the electric drive source and mechanically controls the state of the resistance generating member with respect to the rotation member through the movement mechanism for the movement speed of the actuating member. In this manner, the injection speed and the injection speed of the rod, to which the hydraulic pressure is applied, are controlled through mechanical control by which the resistance generating member is moved relative to the rotation member. This improves the responsiveness of the injection apparatus compared with a case in which injection speed and injection pressure required for respective steps are satisfied by controlling various valves to control the opening degree of a hydraulic fluid passage.

BRIEF DESCRIPTION OF THE DRAWINGS

FIG. 7($b$) is a diagram illustrating a state in which a control unit is held in contact with the shock absorbers shown in FIG. 7($a$);

FIG. 7($c$) is a diagram schematically showing the adjustment mechanism illustrated in FIG. 7($a$);

FIG. 8($b$) is a diagram illustrating a state in which the attenuation rod shown in FIG. 8($a$) is moved in a casing;

DETAILED DESCRIPTION OF THE PREFERRED EMBODIMENTS

First Embodiment

An injection apparatus according to a first embodiment of the present invention will now be described with reference to FIGS. 1 to 4. In the description below, the left side and the right side of each drawing are defined as the first side and the second side, respectively. Similarly, the left end and the right end of each component are defined as the first end and the second end, respectively.

Figure 1:
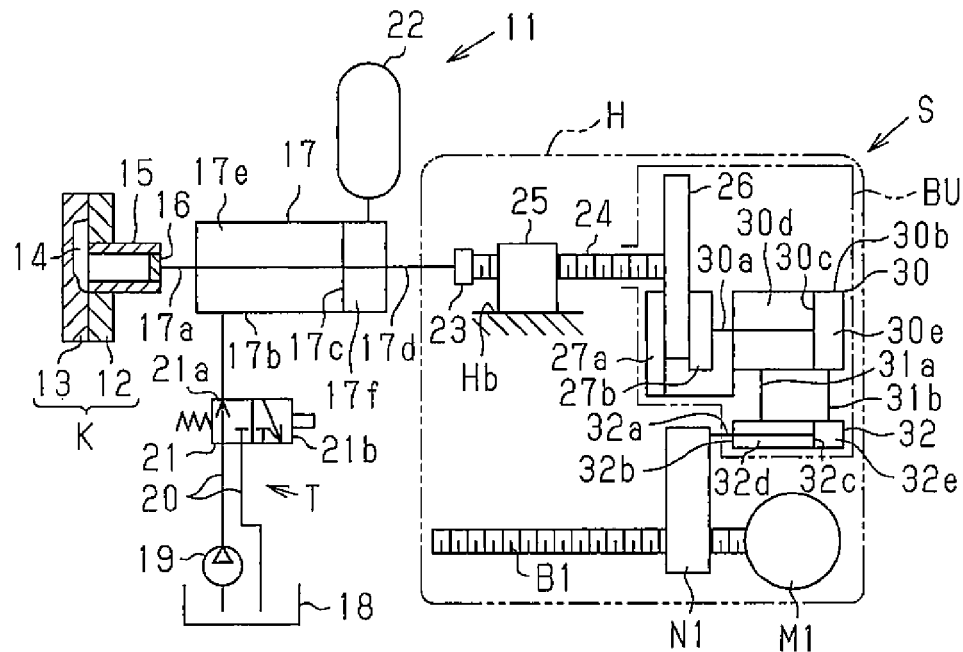
FIG. 1 is a diagram schematically showing an injection apparatus according to a first embodiment of the present invention.

As shown in FIG. 1, a mold K includes a fixed mold portion 12 and a movable mold portion 13. The fixed mold portion 12 and the movable mold portion 13 are joined together, separated from each other, or clamped by a non-illustrated mold clamping device. An injection apparatus 11 uses fluid pressure to inject, or supply, metal material serving as molding material into a cavity 14, which is formed in the mold K. After having been injected into and solidified in the mold K, the metal material is removed from the mold K as a desired molded product.

The fixed mold portion 12 has an injection sleeve 15 communicating with the cavity 14. An injection plunger 16 is slidably mounted in the injection sleeve 15. The injection plunger 16 is connected to a first rod 17$a$, which is one of the rods of a double-rod type injection cylinder 17. A piston 17$c$, which is integral with the first rod 17$a$, is movably received in a cylinder tube 17$b$ of the injection cylinder 17. A second rod 17$d$ is formed integrally with the piston 17$c$ at the side of the piston 17$c$ opposite to the first rod 17$a$. The piston 17$c$ divides the interior of the cylinder tube 17$b$ into a first chamber 17$e$ located at the side corresponding to the first rod 17$a$ and a second chamber 17$f$ arranged at the opposite side, which is the side corresponding to the second rod 17$d$.

An supply-and-drain mechanism T, which selectively supplies and drains hydraulic fluid serving as incompressible fluid with respect to the first chamber 17$e$ of the injection cylinder 17, is connected to the first chamber 17$e$. The supply-and-drain mechanism T is configured by a hydraulic fluid tank 18, a pump 19 for pumping hydraulic fluid out from the hydraulic fluid tank 18, and an electromagnetic switch valve 21 mounted in a passage 20 through which the first chamber 17$e$ is connected to the pump 19. The electromagnetic switch valve 21 is switchable between a first position 21$a$ and a second position 21$b$. When located at the first position 21$a$, the electromagnetic switch valve 21 permits supply of the hydraulic fluid pumped out from the hydraulic fluid tank 18 through the pump 19 to the first chamber 17$e$. When arranged at the second position 21$b$, the electromagnetic switch valve 21 permits drainage of the hydraulic fluid from the first chamber 17$e$ into the hydraulic fluid tank 18.

In the injection cylinder 17, an accumulator 22 serving as a pressure accumulating portion is connected to the second chamber 17$f$, which is located at the opposite side to the side connected to the mold K. The accumulator 22 stores hydraulic fluid. The hydraulic fluid is supplied from the accumulator 22 into the second chamber 17$f$ such that hydraulic pressure (operating pressure) acts on the piston 17$c$ in the direction toward the mold K. The hydraulic pressure can move the first rod 17$a$, the second rod 17$d$, and the piston 17$c$ toward the mold K.

A control unit S is mechanically connected to the second rod 17$d$, which projects from the second chamber 17$f$ of the injection cylinder 17 in a direction separating from the mold K. Specifically, the first end of a rotary shaft 24, which is configured by a ball screw, is connected to the distal end of the second rod 17$d$ through a joint 23. The joint 23 allows the rotary shaft 24 to rotate relative to the second rod 17$d$. The rotary shaft 24 is movable in the same direction as the movement direction of the second rod 17$d$. A nut 25 is threaded onto the rotary shaft 24. The nut 25 is fixed to a body base Hb of the injection apparatus 11. The nut 25 is non-rotational and immovable in the axial direction of the rotary shaft 24. As a result, when the second rod 17$d$ moves forward, the rotary shaft 24 rotates. The rotary shaft 24 thus moves axially forward relative to the nut 25. As a result, in the first embodiment, the nut 25 configures a conversion mechanism that converts linear movement of the second rod 17$d$ into rotation of the rotary shaft 24.

A brake disk 26 serving as a rotation member is connected to the rotary shaft 24 at the second end of the rotary shaft 24 in a manner rotational integrally with the rotary shaft 24. A first brake pad 27$a$ and a second brake pad 27$b$ are arranged opposed to each other at the front side and the rear side, respectively, in the direction of the thickness of the brake disk 26. The first brake pad 27a and the second brake pad 27b are movable in conjunction with each other relative to the brake disk 26. When the first and second brake pads 27a, 27b are pressed against the brake disk 26, the first and second brake pads 27a, 27b slide on the rotating brake disk 26, and generate friction resistance to the brake disk 26 and restricting the rotation of the brake disk 26. As a result, in the first embodiment, the first brake pad 27a and the second brake pad 27b configure a resistance generating member.

The distal end of an actuating rod 30a of an actuating cylinder 30 is joined to the second brake pad 27b so that the actuating rod 30a is moved integrally with the second brake pad 27b. A cylinder tube 30b of the actuating cylinder 30 receives a piston 30c, which is integral with the actuating rod 30a. The piston 30c divides the interior of the cylinder tube 30b into a first rod chamber 30d located at the side corresponding to the actuating rod 30a and a first head chamber 30e arranged at the opposite side to the first rod chamber 30d. The actuating rod 30a extends between the piston 30c and the second brake pad 27b to project through the first rod chamber 30d.

A pilot cylinder 32 is connected to the actuating cylinder 30 through a first fluid supply-and-drain passage 31a and a second fluid supply-and-drain passage 31b. A piston 32c is accommodated in a cylinder tube 32b of the pilot cylinder 32. A pilot rod 32a is formed integrally with the piston 32c. The piston 32c divides the interior of the cylinder tube 32b into a second rod chamber 32d at the side corresponding to the pilot rod 32a and a second head chamber 32e at the opposite side to the pilot rod 32a. The pilot rod 32a extends between the piston 32c and the drive nut N1 to project through the second rod chamber 32d.

The first rod chamber 30d of the actuating cylinder 30 is connected to the second rod chamber 32d of the pilot cylinder 32 through the first fluid supply-and-drain passage 31a. The first head chamber 30e of the actuating cylinder 30 is connected to the second head chamber 32e of the pilot cylinder 32 through the second fluid supply-and-drain passage 31b. Hydraulic fluid serving as incompressible fluid is retained in the rod chambers 30d, 32d and the head chambers 30e, 32e. The first and second fluid supply-and-drain passages 31a, 31b form a closed circuit, through which the incompressible fluid flows.

The diameter of the actuating cylinder 30 is greater than the diameter of the pilot cylinder 32. An amplification circuit for amplifying the thrust force of the actuating rod 30a in the actuating cylinder 30 is configured by the difference in diameter between the actuating cylinder 30 and the pilot cylinder 32 and using the first and second fluid supply-and-drain passages 31a, 31b.

The drive nut N1, which serves as an actuating member, is connected to the distal end of the pilot rod 32a and selectively brought into contact with and separated from the pilot rod 32a. The drive nut N1 is threaded onto a drive ball screw B1. The drive ball screw B1 is rotated by a drive motor M1 serving as an electric drive source. The pilot rod 32a is pressed against the drive nut N1 by the hydraulic pressure of the accumulator 22.

As the drive ball screw B1 rotates to cause the drive nut N1 to proceed, or move, in the axial direction of the drive ball screw B1, the pilot rod 32a of the pilot cylinder 32 proceeds in conjunction with the drive nut N1. This drains the hydraulic fluid from the second rod chamber 32d to the first rod chamber 30d through the first fluid supply-and-drain passage 31a and from the first head chamber 30e into the second head chamber 32e via the second fluid supply-and-drain passage 31b. As a result, the second brake pad 27b, which is integral with the actuating rod 30a, moves separately from the brake disk 26 and the first brake pad 27a moves separately from the brake disk 26 in conjunction with the second brake pad 27b.

Accordingly, in the first embodiment, the actuating cylinder 30, the pilot cylinder 32, and the first and second fluid supply-and-drain passages 31a, 31b configure a movement mechanism by which the second brake pad 27b is moved relative to the brake disk 26 in a manner following movement of the drive nut N1.

In the first embodiment, the brake disk 26, the first brake pad 27a, the second brake pad 27b, the actuating cylinder 30, the first and second fluid supply-and-drain passages 31a, 31b, and the pilot cylinder 32 are accommodated in a housing H to form a unit. In the housing H, the rotary shaft 24, the brake disk 26, the actuating cylinder 30, the first brake pad 27a, the second brake pad 27b, and the pilot cylinder 32 are accommodated as an integral body, which is a brake unit BU. The brake unit BU is movably received in the housing H.

Actuation patterns (injection patterns) of the injection apparatus 11 will hereafter be described with reference to FIG. 2.

The injection apparatus 11 operates according to a low-speed step, a high-speed step, and a pressure-increasing step. The low-speed step is a step at an initial stage of injection. The high-speed step is performed after the low-speed step. In the high-speed step, the injection plunger 16 (the injection cylinder 17) of the injection sleeve 15 is actuated at a high speed compared with the low-speed step. At a later stage of the high-speed step, the injection plunger 16 (the injection cylinder 17) is gradually decelerated. When the speed of the injection plunger 16 (the injection cylinder 17) approximates zero, the injection apparatus 11 starts the pressure-increasing step. The pressure-increasing step is a step at a final stage of injection and carried out after the high-speed step. In the pressure-increasing step, the metal material in the cavity 14 is pressurized using the force generated by the injection plunger 16 of the injection sleeve 15 in the direction proceeding toward the mold K.

Figure 2:
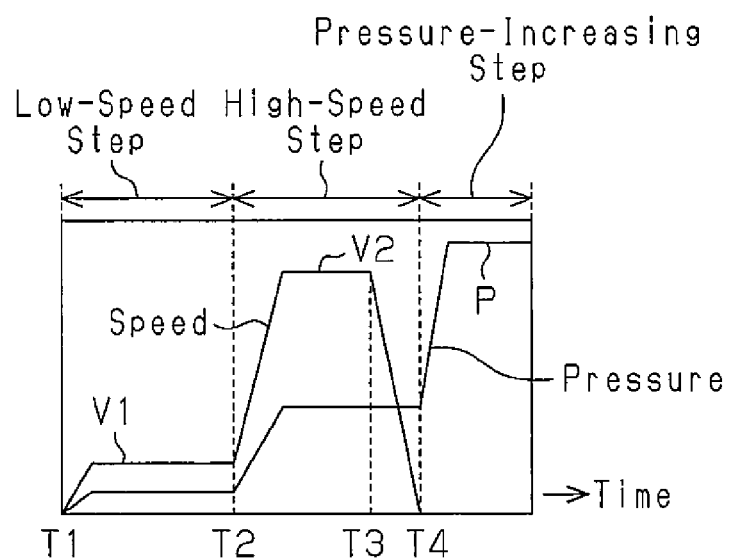
FIG. 2 is a graph representing changes of injection pressure and changes of injection speed in the injection apparatus.

Referring to FIG. 2, the injection apparatus 11 is required to operate in different actuation patterns in the steps. In other words, in the high-speed step, the injection plunger 16 (the injection cylinder 17) must operate at a high speed compared with the low-speed step. In contrast, the injection plunger 16 does not have to operate rapidly in the pressure-increasing step. That is, the injection plunger 16 does not need to be moved. In the pressure-increasing step, the injection plunger 16 (the injection cylinder 17) must operate to produce high pressure compared with the low-speed step and high-speed step. In contrast, the injection plunger 16 does not have to operate to produce high pressure in the low-speed and high-speed steps, compared with the pressure-increasing step.

Operation of the injection apparatus 11 of the present embodiment will now be described.

First, the low-speed step will be described.

As shown in FIG. 1, before the low-speed step is started, the injection plunger 16 of the injection sleeve 15, the first rod 17a and the second rod 17d of the injection cylinder 17, the actuating rod 30a of the actuating cylinder 30, and the pilot rod 32a of the pilot cylinder 32 are arranged at predetermined initial positions, which are illustrated in the drawing. The rods 17a, 30a, 32a located at the initial positions do not apply injection pressure to the metal material supplied into the injection sleeve 15 (at time point T1 in FIG. 2).

The second chamber 17f receives hydraulic fluid from the accumulator 22. The piston 17c of the injection cylinder 17 receives, as hydraulic pressure, energy necessary for producing thrust force for the injection plunger 16.

When located at the initial positions, the drive motor M1 and the drive nut N1 are stopped. The pilot rod 32a of the pilot cylinder 32 is pressed against the drive nut N1. The hydraulic pressure applied by the pilot cylinder 32 is amplified by the amplification circuit and then applied to the piston 30c of the actuating cylinder 30. The amplified hydraulic pressure presses the second brake pad 27b, which is integral with the actuating rod 30a, against the brake disk 26 and presses the first brake pad 27a against the brake disk 26 in conjunction with the second brake pad 27b.

The brake unit BU thus restricts rotation of the brake disk 26 and rotation of the rotary shaft 24, which is integral with the brake disk 26. Movement of the piston 17c of the injection cylinder 17, which is in a state movable by the hydraulic pressure from the accumulator 22, is restricted by the second rod 17d. The piston 17c is prohibited from moving. At this time, since the hydraulic pressure from the accumulator 22 acts on the piston 17c, the piston 17c is held in a standby state where the piston 17c can move immediately when permitted.

After preparation including clamping of the fixed mold portion 12 and the movable mold portion 13 and metal material supply to the injection sleeve 15 is completed, the injection apparatus 11 initiates the low-speed step. In the low-speed step, the injection speed is set to V1, as represented in FIG. 2. At the same time, the electromagnetic switch valve 21 is switched to the second position 21b.

Figure 3:
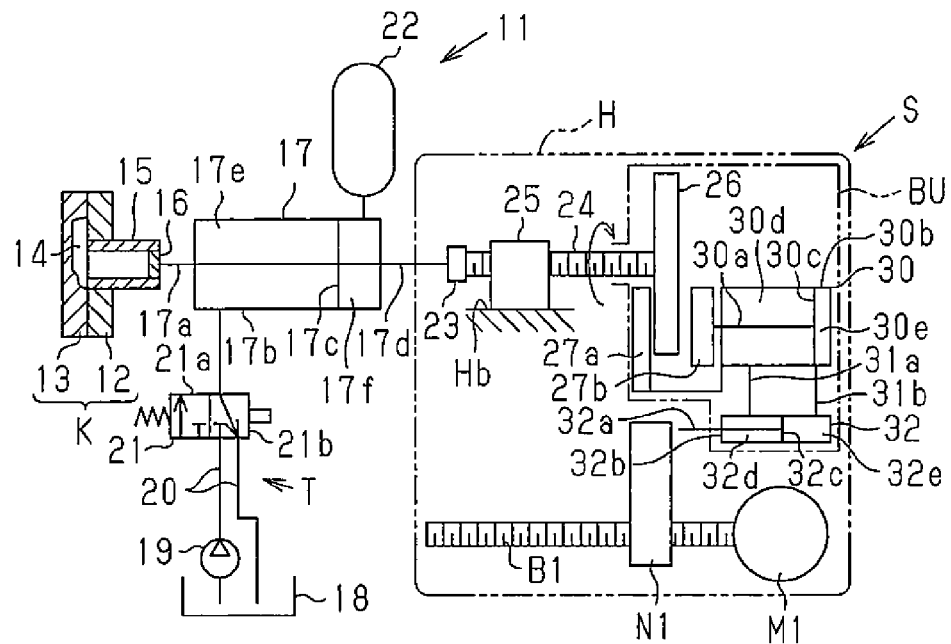
FIG. 3 is a diagram schematically illustrating a state in which an injection cylinder and a pilot cylinder have advanced.

As illustrated in FIG. 3, when the drive motor M1 is activated, the drive ball screw B1 rotates to cause the drive nut N1, which is threaded to the drive ball screw B1, to proceed. This temporarily causes the pilot rod 32a of the pilot cylinder 32, which has been pressed against the drive nut N1, to proceed together with the drive nut N1.

As the pilot rod 32a proceeds, the hydraulic fluid in the second rod chamber 32d is drained to the first rod chamber 30d through the first fluid supply-and-drain passage 31a, and the hydraulic fluid in the first head chamber 30e is introduced into the second head chamber 32e through the second fluid supply-and-drain passage 31b. The actuating rod 30a thus projects into the cylinder tube 30b, thus separating the second brake pad 27b, which is integral with the actuating rod 30a, from the brake disk 26. The first brake pad 27a is also separated from the brake disk 26, in conjunction with the second brake pad 27b. At this stage, the first rod 17a and the second rod 17d slowly proceed and the brake disk 26 and the rotary shaft 24 slowly start rotating.

Figure 4:
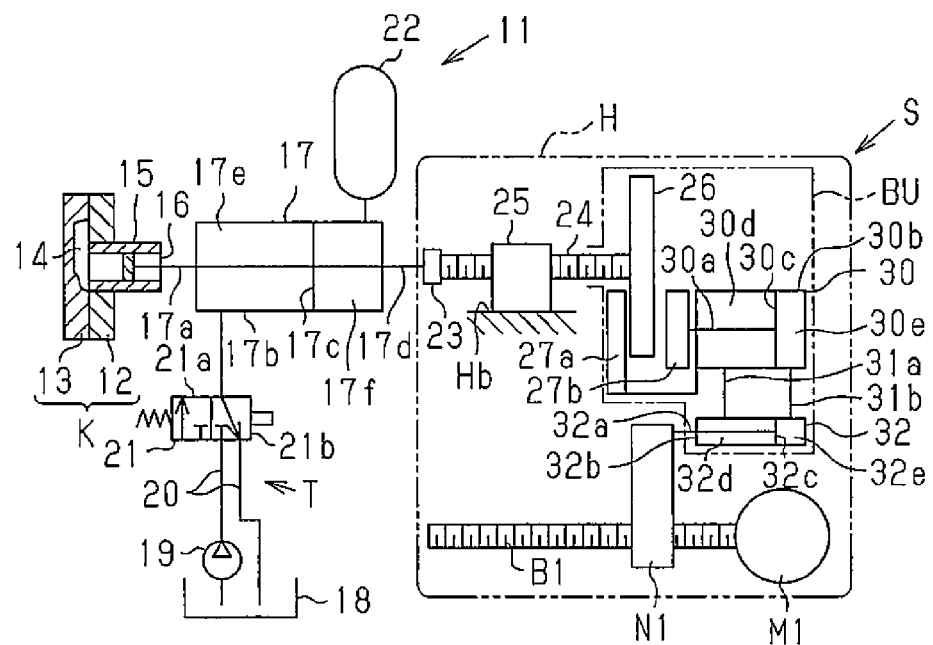
FIG. 4 is a diagram schematically showing a state in which the injection cylinder has advanced.

As a result, with reference to FIG. 4, the piston 17c, movement of which has been restricted by the brake unit BU, receives the hydraulic pressure from the accumulator 22 and thus proceeds toward the first chamber 17e at the aforementioned injection speed V1. As a result, the injection plunger 16, which is joined to the first rod 17a, to proceed toward the cavity 14 at the injection speed V1. This injects the metal material from the injection sleeve 15 into the cavity 14. Simultaneously, the hydraulic fluid in the first chamber 17e is drained from to the hydraulic fluid tank 18 via the electromagnetic switch valve 21 at the second position 21b.

Also, the housing H (the brake unit BU), which is connected to the injection plunger 16 via the first rod 17a, the second rod 17d, and the rotary shaft 24, proceeds to cause the injection plunger 16 to proceed. When the injection plunger 16 reaches the final position of the low-speed step (at time point T2 in FIG. 3), the injection apparatus 11 ends the low-speed step and starts the high-speed step. As represented in FIG. 2, the injection speed of the injection plunger 16 increases to speed V2 in the high-speed step. The injection apparatus 11 is then operated in the above-described manner to accomplish the high-speed step. The first rod 17a and the second rod 17d move forward each at a high speed in the high-speed step. This rotates the brake disk 26 and the rotary shaft 24 at a high speed.

In the high-speed step, when the injection plunger 16 is moved close to an ending position of the high-speed step (at time point T3 of FIG. 2), the speed of the drive motor M1 is reduced. This reduces the speed of the first and second rods 17a, 17d of the injection cylinder 17. Afterwards, when the injection plunger 16 reaches the ending position of the high-speed step (at time point T4 in FIG. 2), forward movement of the first and second rods 17a, 17d of the injection cylinder 17 is substantially stopped. The high-speed step is thus ended and the pressure-increasing step is started by the injection apparatus 11.

In the pressure-increasing step, pressure applied by the injection plunger 16 reaches an injection pressure P, as represented in FIG. 2. In the pressure-increasing step, the pilot rod 32a does not contact the drive nut N1. The hydraulic pressure from the accumulator 22 is thus applied to the injection plunger 16 via the first rod 17a.

Afterwards, when the metal material in the cavity 14 is solidified, the first rod 17a of the injection cylinder 17 is caused to recede. At this stage, the electromagnetic switch valve 21 is switched to the first position 21a. This drives the pump 19 to supply the hydraulic fluid pumped by the pump 19 to the first chamber 17e of the injection cylinder 17. The first rod 17a of the injection cylinder 17 thus recedes and the injection plunger 16 also recedes. This causes the housing H to recede and returns the hydraulic fluid from the second chamber 17f into the accumulator 22. Afterwards, the fixed mold portion 12 and the movable mold portion 13 are separated from each other, and the molded product is removed from the mold K.

The first embodiment has the advantages described below.

(1) In the injection apparatus 11, the accumulator 22 is connected to the second chamber 17f of the injection cylinder 17. This configuration causes the accumulator 22 to apply hydraulic pressure to the piston 17c. The first rod 17a is thus held in a standby state in which the first rod 17a is immediately movable toward the mold K. The movement speed of the first rod 17a is controlled by the control unit S. In the control unit S, the first end of the rotary shaft 24 is joined to the second rod 17d of the injection cylinder 17. The nut 25 is threaded onto the rotary shaft 24 and the brake disk 26 is connected to the second end of the rotary shaft 24. The movement mechanism is provided to move the second brake pad 27b in conjunction with the drive nut N1, which is linearly moved by the drive motor M1. By controlling movement of the drive nut N1 by means of the drive motor M1 and adjusting the positions of the first and second brake pads 27a, 27b relative to the brake disk 26, the injection speed and the injection pressure of the injection cylinder 17 (the injection plunger 16), which are regulated by the hydraulic pressure from the accumulator 22, are controlled. That is, the injection speed and the injection pressure of the injection cylinder 17 are controlled directly through mechanical control. This improves responsiveness of the injection apparatus 11 compared with an injection apparatus that satisfies injection speed and injection pressure required for respective steps by controlling various valves to adjust the opening degree of a hydraulic fluid passage.

(2) Linear movement of the piston 17c (the first rod 17a), which has been receiving the hydraulic pressure applied by the accumulator 22, is converted into rotation of the brake disk 26 by the nut 25 and the rotary shaft 24. The rotation of the brake disk 26 is controlled to control the movement of the piston 17c. The injection speed and the injection pressure of the injection cylinder 17 are thus precisely controlled through control on the drive motor M1. For example, the low-speed step requires precise control of the injection speed such that the metal material does not catch air. In the first embodiment, the injection cylinder 17 (the injection plunger 16) is operated at an optimal operating speed and an optimal acceleration. This reliably ensures that the metal material in the injection sleeve 15 does not catch air and is not deformed in a wave-like shape.

(3) The diameter of the actuating cylinder 30 is greater than the diameter of the pilot cylinder 32. By employing the cylinders with different diameters, the thrust force of the pilot cylinder 32, which has a comparatively small diameter, is amplified to cause the actuating cylinder 30 to produce great thrust force. The first and second brake pads 27a, 27b are thus firmly pressed against the brake disk 26. As a result, a motor with a minimum necessary output may be employed as the drive motor M1 for driving the pilot cylinder 32, and the cost for the drive motor M1 is saved.

Second Embodiment

An injection apparatus 11 of a second embodiment according to the present invention will now be described with reference to FIG. 5. The same components in the second embodiment as those in the first embodiment are given the same reference numerals and description thereof is omitted.

Figure 5:
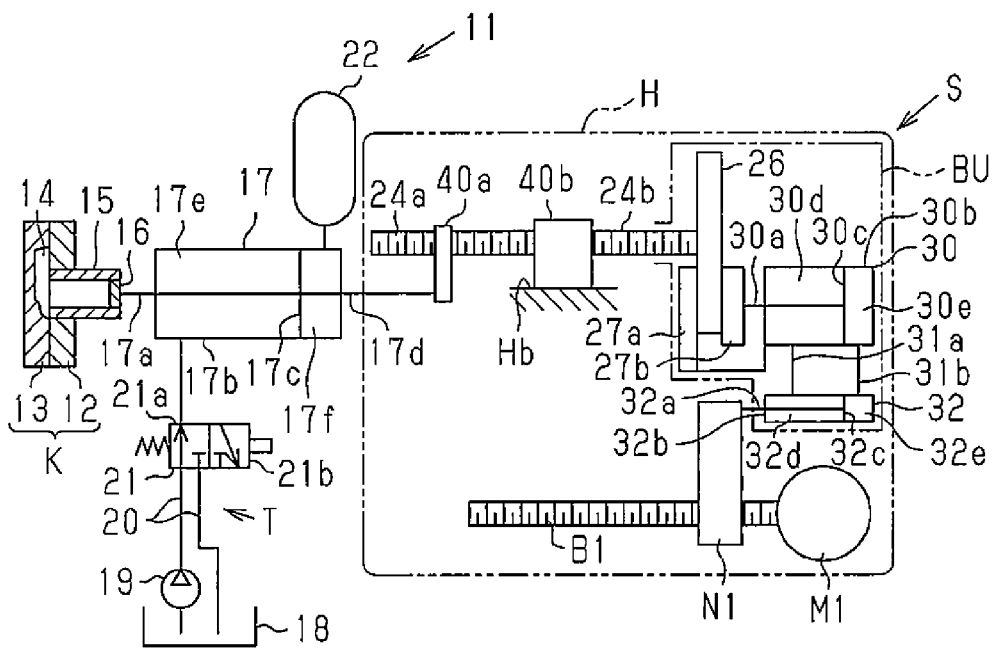
FIG. 5 is a diagram schematically showing an injection apparatus according to a second embodiment of the present invention.

As shown in FIG. 5, in the injection apparatus 11, a first nut 40a is connected to the first end of the second rod 17d of the injection cylinder 17. A first rotary shaft 24a, which is a ball screw, is threaded onto the first nut 40a. The first end of a second rotary shaft 24b, which is also a ball screw, is connected to the first rotary shaft 24a in a manner rotational integrally with the first rotary shaft 24a. The brake disk 26 is joined to the second end of the second rotary shaft 24b. A second nut 40b is threaded onto the second rotary shaft 24b and fixed to the body base Hb. The threaded portion of the second rotary shaft 24b is oriented in the opposite direction to the direction in which the threaded portion of the first rotary shaft 24a is oriented. In the second embodiment, the first nut 40a and the second nut 40b configure a conversion mechanism.

Therefore, in addition to the advantages (1) to (3) of the first embodiment, the second embodiment achieves the following advantage.

(4) When the first nut 40a moves relative to the first rotary shaft 24a at a speed V, the first nut 40a moves relative to the second nut 40b, which is immovable, at the speed V. The threaded portion of the first rotary shaft 24a, which is threaded onto the first nut 40a, is oriented in the opposite direction to the direction in which the threaded portion of the second rotary shaft 24b, which is threaded onto the second nut 40b, is oriented. As a result, the first nut 40a and the second nut 40b would move toward or separately from each other when the first rotary shaft 24a and the second rotary shaft 24b rotate simultaneously. However, since the second nut 40b is immovably fixed to the body base Hb, the first nut 40a moves relative to the second nut 40b at the speed twice as great as speed V.

As a result, in the second embodiment, the movement speed of the first nut 40a is increased without changing the rotation speed of the first and second rotary shafts 24a, 24b. This increases the speed of the first nut 40a and the injection speed of the injection cylinder 17, despite of upper limits of the rotation speed specific for the respective ball screws configuring the first and second rotary shafts 24a, 24b.

Third Embodiment

An injection apparatus 11 of a third embodiment according to the present invention will now be described with reference to FIG. 6. The same components in the third embodiment as those in the first and second embodiments are given the same reference numerals and description thereof is omitted.

Figure 6:
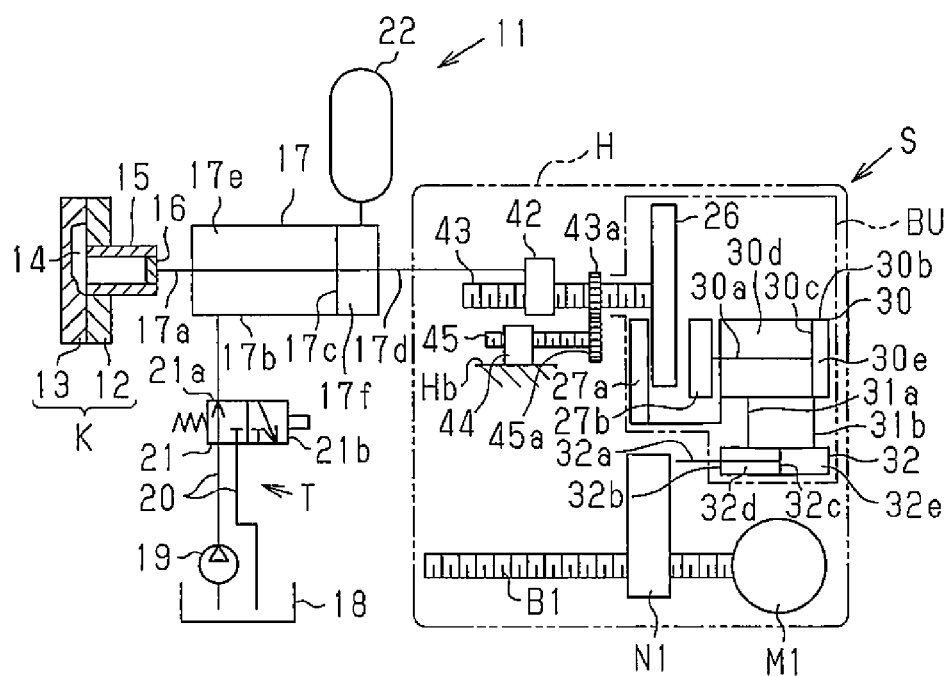
FIG. 6 is a diagram schematically showing an injection apparatus according to a third embodiment of the present invention.

As illustrated in FIG. 6, in the injection apparatus 11, a joint nut 42 serving as a conversion mechanism is connected to the first end of the second rod 17d of the injection cylinder 17. A driving shaft 43, which is a ball screw, is threaded onto the joint nut 42. The driving shaft 43 is movable relative to the injection cylinder 17. A driving gear 43a is connected to a portion of the driving shaft 43 at the second side in a manner rotational integrally with the driving shaft 43. The brake disk 26 is connected to the second end of the driving shaft 43.

A fixed nut 44 is immovably fixed to the body base Hb. A driven shaft 45, which is also a ball screw, is threaded onto the fixed nut 44. The driven shaft 45 is parallel to the driving shaft 43 and the second rod 17d. A driven gear 45a is connected to the driven shaft 45 in a manner rotational integrally with the driven shaft 45. The driven gear 45a is meshed with and thus connected to the driving gear 43a.

Therefore, in addition to the advantages (1) to (3) of the first embodiment, the third embodiment achieves the following advantage.

(5) When the joint nut 42 moves toward the mold K at the speed V relative to the driving shaft 43, the driving shaft 43 rotates. Since the driving gear 43a and the driven gear 45a are arranged between the driving shaft 43 and the driven shaft 45, the driving shaft 43, which is threaded onto the joint nut 42, rotates in the opposite direction to the rotating direction of the driven shaft 45, which is threaded onto the fixed nut 44. In this state, if the driven shaft 45 rotates, the fixed nut 44 would move separately from the mold K at the speed V. In other words, the joint nut 42 and the fixed nut 44 would move separately from each other each at the speed V. However, since the fixed nut 44 is immovably fixed to the body base Hb, the joint nut 42 is moved relative to the fixed nut 44 at the speed twice as great as speed V.

As a result, in the third embodiment, the movement speed of the joint nut 42 is increased without changing the rotation speed of the driving shaft 43 and the driven shaft 45. This increases the speed of the joint nut 42 and the injection speed of the injection cylinder 17 despite of upper limits of the rotation speed specific for the ball screws configuring the driving shaft 43 and the driven shaft 45. Additionally, since the driving shaft 43 and the driven shaft 45 are configured by typical ball screws, the injection speed of the injection cylinder 17 is increased through an inexpensive configuration.

Fourth Embodiment

Figure 7:
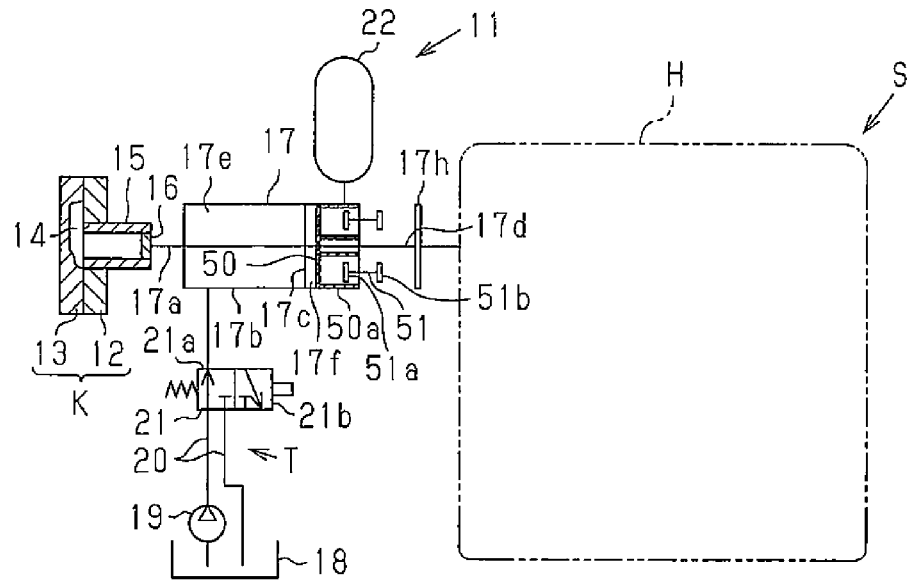
FIG. 7($a$) is a diagram schematically showing an injection apparatus according to a fourth embodiment of the present invention.
Figure 7:
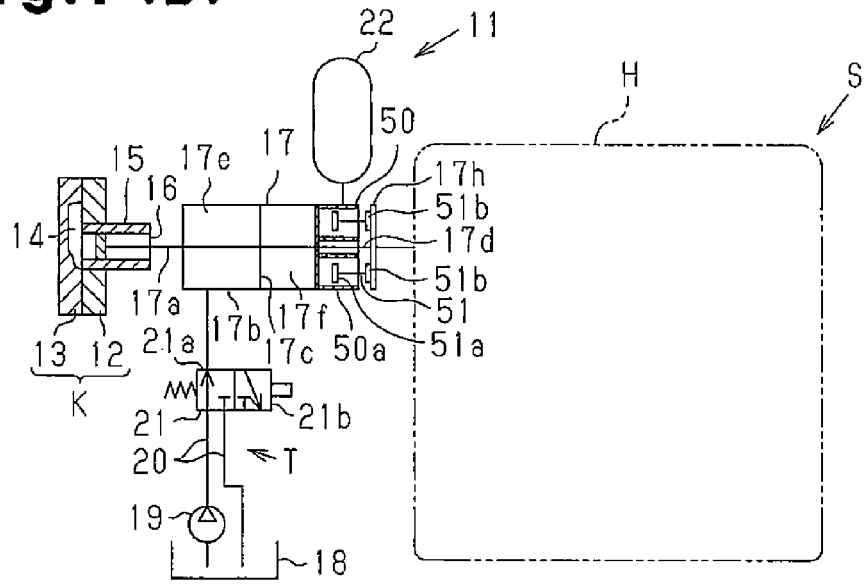
Figure 7:
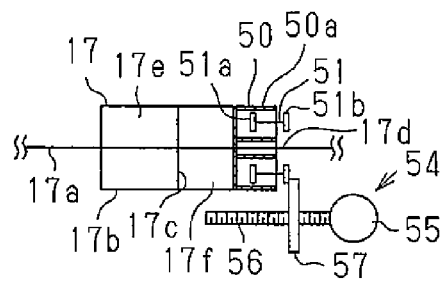

An injection apparatus 11 of a fourth embodiment according to the present invention will now be described with reference to FIG. 7. The same components in the fourth embodiment as those in the first to third embodiments are given the same reference numerals and description thereof is omitted.

As illustrated in FIG. 7(a), a contact portion 17h is connected to the side of the second rod 17d close to the control unit S in a manner rotational integrally with the second rod 17d. The contact portion 17h is movable integrally with the housing H. An attenuation mechanism is arranged at the side of the injection cylinder 17 close to the control unit S. The contact portion 17h of the housing H of the control unit S contacts the attenuation mechanism when the speeds of the first and second rods 17a, 17d of the injection cylinder 17 are reduced. Specifically, a plurality of shock absorbers 50, each of which is a shock absorbing member included in the attenuation mechanism, are attached to the side wall of the second chamber 17f of the injection cylinder 17 close to the control unit S. Each of the shock absorbers 50 has a tube 50a containing fluid. Each of the tubes 50a movably accommodates a piston 51a, which is integral with a piston rod 51. A non-illustrated orifice is formed in each tube 50a. A contact member 51b is joined to the end of each piston rod 51 projecting from the corresponding tube 50a.

In the injection apparatus 11 of the fourth embodiment, when the injection plunger 16 is moved to a position close to an ending position of the high-speed step in the high-speed step (at time point T3 in FIG. 2), the speed of the drive motor M1 is reduced. This reduces the speed of the first and second rods 17a, 17d of the injection cylinder 17. As the speed of the injection cylinder 17 is thus reduced and the speed of the control unit S is also reduced, referring to FIG. 7(b), the contact portion 17h comes into contact with each contact member 51b and presses the contact member 51b into the corresponding tube 50a. The fluid in the tube 50a is thus drained from the orifice such that the corresponding piston rod 51 slowly retreats into the tube 50a. In this manner, the shock absorbers 50 slowly reduce the operating speed of the control unit S, thus stopping the control unit S.

As illustrated in FIG. 7(c), in the attenuation mechanism, each shock absorber 50 may include an adjustment mechanism 54 for adjusting the position of the piston rod 51 (the projection amount of the piston rod 51 from the tube 50a) in the movement direction of the first and second rods 17a, 17d. The adjustment mechanism 54 includes an adjustment motor 55, an adjustment ball screw 56 rotated by the adjustment motor 55, and an adjustment nut 57 threaded onto the adjustment ball screw 56. The position of the adjustment nut 57 is adjusted through actuation of the adjustment motor 55. In this manner, the projection amount of the piston rod 51 (the contact member 51b) from the tube 50a in the movement direction is adjusted.

Therefore, in addition to the advantages (1) to (4) of the first embodiment, the fourth embodiment achieves the following advantages.

(7) The injection cylinder 17 has the shock absorbers 50. As the speeds of the first and second rods 17a, 17d of the injection cylinder 17 are reduced in the high-speed step, the contact portion 17h of the control unit S contacts each shock absorber 50 to cause the shock absorber 50 to attenuate energy produced through movement of the control unit S. The control unit S is thus stopped slowly.

(8) If each shock absorber 50 includes the adjustment mechanism 54, the projection amount of the piston rod 51 (the contact member 51b) from the tube 50a is adjusted through the adjustment mechanism 54. As a result, the position at which the contact portion 17h of the control unit S contacts and presses each shock absorber 50 is adjusted such that the timing for starting speed reduction of the control unit S is adjusted.

Fifth Embodiment

Figure 8A:
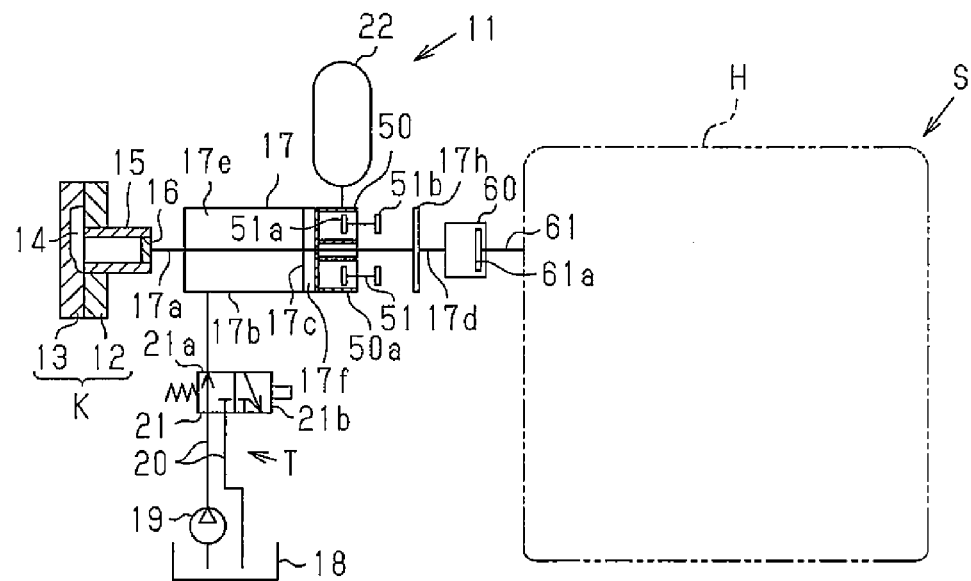
FIG. 8($a$) is a diagram schematically showing an injection apparatus according to a fifth embodiment of the present invention.

An injection apparatus 11 of a fifth embodiment according to the present invention will now be described with reference to FIG. 8(a). The same components in the fifth embodiment as those in the first to fourth embodiments are given the same reference numerals and description thereof is omitted.

An attenuation rod 61 is connected to the side of the housing H of the control unit S close to the injection cylinder H. A box-like casing 60 serving as an engaged member is connected to the side of the second rod 17d of the injection cylinder 17 close to the control unit S. The casing 60 is moved in conjunction with the second rod 17d. A T-shaped member 61a serving as an engaging member is formed at the side of the attenuation rod 61 close to the injection cylinder 17. The attenuation rod 61, together with the T-shaped member 61a, is movably received in the casing 60. The speed of the second rod 17d is controlled by the control unit S as in the cases of the above-described embodiments.

Figure 8B:
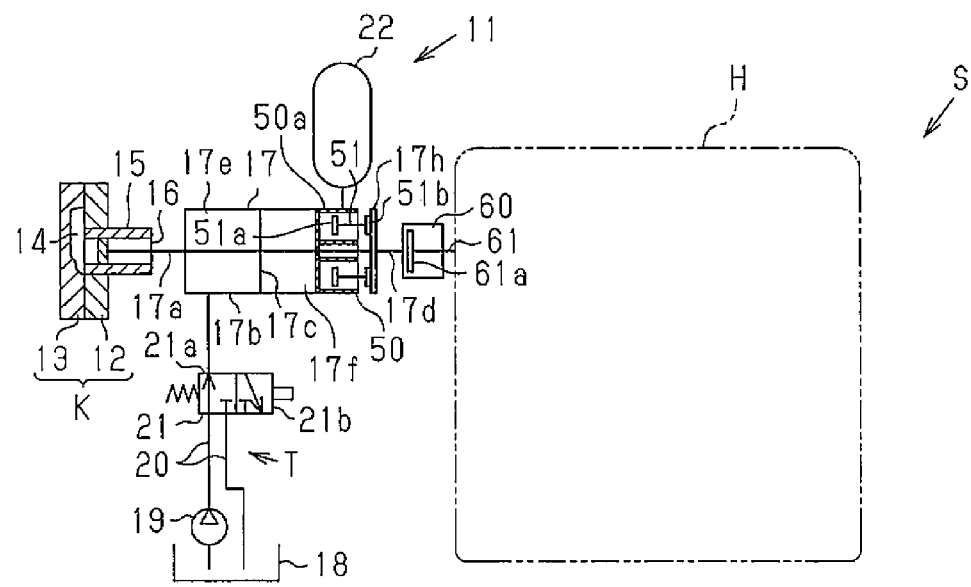

To accomplish speed reduction, the speeds of the injection cylinder 17 and the control unit S are reduced by a brake of the control unit S and, as illustrated in FIG. 8(b), the contact portion 17h contacts the shock absorbers 50. The second rod 17d and the control unit S are then stopped by means of the brake of the control unit S. Alternatively, as the speeds of the second rod 17d and the control unit S are continuously reduced, the attenuation rod 61 may contact the inner wall of the casing 60 close to the injection cylinder 17 to stop the control unit S and then the second rod 17d.

The fifth embodiment has the advantage described below in addition to the same advantages as the advantages (1) to (4) of the first embodiment and the advantage (7) of the fourth embodiment.

(9) When the speed of the control unit S is reduced so that the control unit S contacts the shock absorbers 50, the contact portion 17h contacts the shock absorbers 50 and then the T-shaped member 61a contacts the inner wall of the casing 60 close to the injection cylinder 17. In this case, the speed of the control unit S is thus further reduced in the period from when the contact portion 17h contacts the shock absorbers 50 to when the attenuation rod 61 contacts the inner wall of the casing 60. In other words, the shock absorbers 50 receive small load compared with the case in the fourth embodiment. The shock absorbers 50 thus can be reduced in size. In the fifth embodiment, the space in the casing 60 of the casing 60 at the side corresponding to the T-shaped member 61a and the injection cylinder 17 configures a permitting portion.

The casing 60 and the attenuation rod 61 may be employed also in the first to fourth embodiments.

In the fifth embodiment, the T-shaped member 61a serving as the engaging member is mounted in the control unit S and the casing 60 serving as the engaged member is arranged on the second rod 17d. However, the casing 60 may be provided in the control unit S and the T-shaped member 61a may be arranged on the second rod 17d.

The engaging member and the engaged member are the T-shaped member 61a and the casing 60, respectively, but not restricted to these components. For example, a floating joint or a hook may be employed.

Sixth Embodiment

An injection apparatus 11 of a sixth embodiment according to the present invention will now be described with reference to FIG. 9. The same components in the sixth embodiment as those in the first to fifth embodiments are given the same reference numerals and description thereof is omitted.

Figure 9:
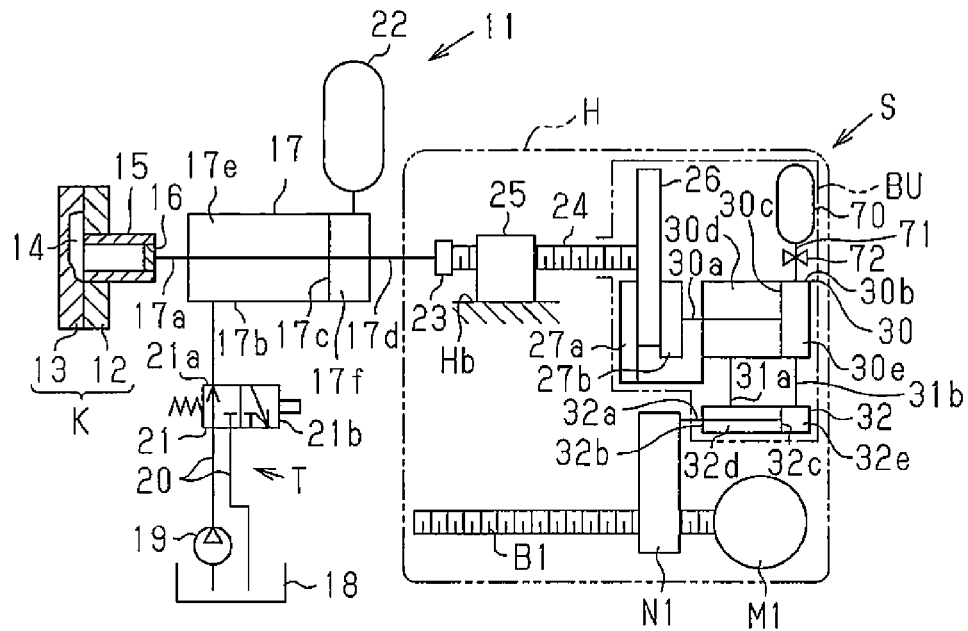
FIG. 9 is a diagram schematically showing an injection apparatus according to a sixth embodiment of the present invention.
Figure 10:
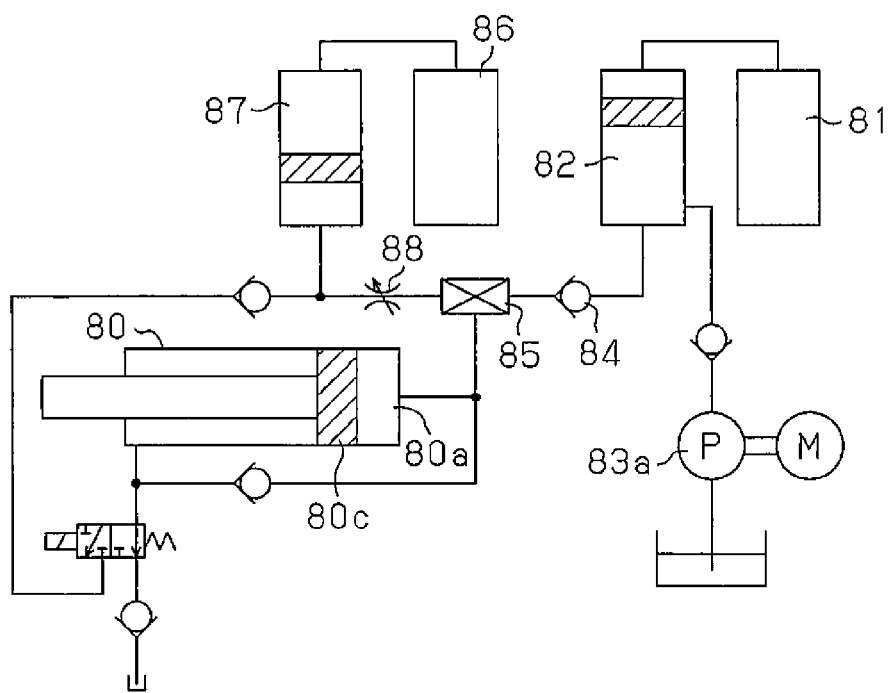
FIG. 10 is a diagram schematically showing an injection apparatus of the background art.

As illustrated in FIG. 9, a brake accumulator 70 serving as a second pressure accumulating portion for a brake is connected to a wall of the first head chamber 30e of the actuating cylinder 30 at the opposite side to the actuating rod 30a. The first head chamber 30e is connected to the brake accumulator 70 through a fluid supply-and-drain passage 71. An on-off valve 72 is mounted in the fluid supply-and-drain passage 71. The on-off valve 72 is normally closed such that the pressure accumulated in the brake accumulator 70 is not applied to the first head chamber 30e.

When the drive motor M1 has a failure like failed power supply or failed operation, the drive motor M1 is rotational freely. This causes unintentional movement, which is projecting movement, of the first rod 17a and the second rod 17d toward the mold K. In this case, the on-off valve 72 is opened to apply the hydraulic pressure from the brake accumulator 70 to the first head chamber 30e.

The actuating rod 30a thus moves toward the mold K to move the second brake pad 27b, which is integral with the actuating rod 30a, toward the brake disk 26. This presses the first brake pad 27a and the second brake pad 27b against the brake disk 26. The brake unit BU thus restricts rotation of the brake disk 26, thus restricting rotation of the rotary shaft 24, which is integral with the brake disk 26. As a result, movement of the second rod 17d of the injection cylinder 17 is restricted through the rotary shaft 24.

The sixth embodiment has the advantage described below in addition to the same advantages as the advantages (1) to (4) of the first embodiment.

(10) Even when the drive motor M1 has a failure, the hydraulic pressure applied by the brake accumulator 70 prevents unintentional movement, such as projection, of the injection cylinder 17.

The above described embodiments may be modified as follows.

The sixth embodiment may also employ the casing 60 and the attenuation rod 61.

The diameter of the actuating cylinder 30 and the diameter of the pilot cylinder 32 may be equal to each other.

The electric drive source of the pilot cylinder 32 may be changed to a liner motor. The linear motor directly causes linear movement of the drive nut N1.

The injection apparatus 11 may be used in an injection apparatus that injects plastic material into the cavity 14 to mold a plastic product.

The invention claimed is:

1. An injection apparatus that injects molding material into a mold through an injection cylinder operated by fluid pressure of an incompressible fluid to fill the mold with the molding material, the injection cylinder having a side connected to the mold and an operation chamber located at a side opposite to the side connected to the mold, the injection apparatus comprising:
a pressure accumulating portion, which is connected to the operation chamber to accumulate the fluid pressure;
a rod mounted in the injection cylinder and projected from the operation chamber in a direction separating from the mold; and
a control unit connected to the rod to control a movement speed of the rod,
wherein the control unit includes
a rotary shaft movable in the same direction as the movement direction of the rod in a manner following movement of the rod,
a conversion mechanism for converting linear movement of the rod to rotation of the rotary shaft;
a rotation member connected to the rotary shaft and rotated integrally with the rotary shaft;
a resistance generating member that slides on and contacts the rotation member to generate friction resistance;
an actuating member moved by an electric drive source; and
a movement mechanism for moving the resistance generating member relative to the rotation member in a manner following movement of the actuating member.

2. The injection apparatus according to claim 1, wherein the movement mechanism includes:
an actuating cylinder having an actuating rod, to which the resistance generating member is connected, a first rod chamber, through which the actuating rod extends, and a first head chamber located at the opposite side to the first rod chamber;
a pilot cylinder having a pilot rod operating, which follows the actuating member, a second rod chamber, through which the pilot rod extends, and a second head chamber arranged at the opposite side to the second rod chamber; and
a closed circuit, in which the incompressible fluid flows, wherein the closed circuit connects the first rod chamber to the second rod chamber and connects the first head chamber to the second head chamber.

3. The injection apparatus according to claim 2, wherein the diameter of the actuating cylinder is greater than the diameter of the pilot cylinder.

4. The injection apparatus according to claim 2, further comprising:
a second pressure accumulating portion for a brake, the second pressure accumulating portion being connected to the first head chamber;
a second closed circuit, in which the incompressible fluid flows, wherein the second closed circuit connects the second pressure accumulating portion to the first head chamber; and
an on-off valve for selectively opening and closing the second closed circuit.

5. The injection apparatus according to claim 1, further comprising an attenuation mechanism mounted at a side of the injection cylinder close to the control unit, wherein a housing of the control unit contacts the attenuation mechanism when the speed of the rod of the injection cylinder is reduced.

6. The injection apparatus according to claim 5, wherein the attenuation mechanism includes a shock absorbing member arranged at a side of the operation chamber of the injection cylinder close to the control unit.

7. The injection apparatus according to claim 6, wherein
the attenuation mechanism includes a housing having a contact portion that contacts the shock absorbing member, and
the shock absorbing member includes an adjustment mechanism for adjusting the position of the rod of the injection cylinder in the movement direction of the rod of the injection cylinder.

8. The injection apparatus according to claim 5, further comprising:
an attenuation rod arranged at a side of the control unit close to the injection cylinder;
an engaging member mounted on the attenuation rod and moved in conjunction with the rod of the injection cylinder;
an engaged member arranged at the side of the injection cylinder close to the control unit, wherein the engaged member is engageable with the engaging member; and
a permitting portion located in the engaged member, wherein the permitting portion permits movement of the engaging member relative to the engaged member.

9. The injection apparatus according to claim 1, further comprising a body base, wherein
the conversion mechanism includes a joint nut connected to the rod of the injection cylinder, and
the rotary shaft includes:
a driving shaft connected to the injection cylinder by the joint nut in a manner movable relative to the injection cylinder;
a driving gear that is rotated integrally with the driving shaft;
a driven gear connected to the driving gear in a meshed manner;
a driven shaft that is rotated integrally with the driven gear, and a fixed nut threaded onto the driven gear and fixed to the body base.

10. The injection apparatus according to claim 1, further comprising a body base,
wherein the rotary shaft includes:
a first rotary shaft having a threaded portion oriented in a certain direction; and
a second rotary shaft formed integrally with the first rotary shaft, the second rotary shaft having a threaded portion oriented in the opposite direction to the direction in which the threaded portion of the first rotary shaft is oriented, and the conversion mechanism includes
a first nut that is threaded onto the first rotary shaft and connected to the rod of the injection cylinder; and
a second nut that is threaded onto the second rotary shaft and fixed to the body base.

* * * * *